United States Patent Office 3,826,817
Patented July 30, 1974

3,826,817
METAL HALIDES WITH LOW HYDROXYL ION CONTAMINATION
Ricardo C. Pastor, Manhattan Beach, and Antonio C. Pastor, Santa Monica, Calif., assignors to Hughes Aircraft Company, Culver City, Calif.
No Drawing. Filed July 26, 1972, Ser. No. 275,130
Int. Cl. C01d 3/00
U.S. Cl. 423—499                    11 Claims

ABSTRACT OF THE DISCLOSURE

The present invention is directed to the synthesis of metal halides which have extremely low hydroxyl ion contamination levels; e.g., $10^{-5}$, $10^{-6}$, or less. Such materials may be used to grow single crystals from which laser windows of excellent mechanical, thermal, and optical properties may be produced.

BACKGROUND OF THE INVENTION

Considerable effort has been spent in trying to produce windows for high power $CO_2$ lasers. Such windows need a proper combination of mechanical, thermal, and optical properties. Many materials which are transparent at the desired wavelength are eliminated from consideration because they fail in one or the other of the necessary properties. Alkali halides are among the few materials which, at least chemically, seem to have the desired combination of properties. Unfortunately, windows produced from alkali halide single crystals in the past have suffered from levels of hydroxyl ion contamination which resulted in the windows having an undesirable degree of absorbancy of the laser beam. The absorbancy, in turn, causes the window to heat up and become distorted.

THE INVENTION

We have found that metal halides with extremely low hydroxyl ion contamination levels may be synthesized by reacting an alkali salt in the solid state with a gaseous compound that is capable of simultaneously (a) replacing the anion of the salt with a halide, and (b) gettering any water that might be produced by the chemical reaction. The alkali salt is preferably one wherein the cation is sodium or potassium; the anion may be any anion that can be displaced by the gaseous halide ion. Typical anions useful within the scope of the present invention are carbonate, bicarbonate, oxalate, formate and acetate.

The halide ion which is necessary for the reaction may be provided by a carbon tetrahalide or a carbonyl halide. Particularly useful members of these groups include carbon tetrachloride, carbon tetrabromide, and phosgene. The carbon tetrahalide acts in a different manner than the carbonyl halide. The carbon tetrahalide, e.g., $CCl_4$, liberates the free halogen by dissociation which can act on the $OH^-$ by electron transfer,

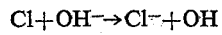

to substitute the halide ($Cl^-$) in its place. The OH produced reacts as follows:

The carbonyl halide, e.g., $COCl_2$, substitutes a $Cl^-$ for $OH^-$ by hydrolysis:

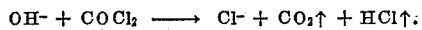

In any event, the halogenating agent should be one which is capable at an elevated temperature to provide nascent halogen, as indicated by the following equation for carbon tetrachloride:

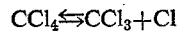

In one mode for carrying out the present invention, the finely divided alkali salt is placed in a container that will not react with chlorine, even at elevated temperatures. Carbon ware and silica ware are especially useful for this purpose, particularly if they have been pre-treated with the gaseous halide compound. The boat containing the salt is put into a reaction chamber, which is then sealed except for a gas inlet means at one end and a gas outlet means at the other end. Preferably the long axis of the reaction chamber will be horizontal. The halogenating agent, in gaseous form, is introduced into the reaction chamber through the gas inlet means. It is allowed to pass over the metal salt and react therewith to form a corresponding metal halide. Gaseous products of the reaction, such as carbon dioxide, hydrogen chloride, and phosgene, are swept from the reaction chamber in the continuing flow of the gas stream, leaving through the gas outlet means.

In general, we prefer to introduce the halogenating agent into the reaction chamber in a diluted form. For example, an inert gas such as helium or nitrogen may be bubbled through a liquid halogenating agent or merged with a stream of gaseous halogenating agent, and the mixed gasses are passed into the reaction zone. The liquid halogenating agent may be at an elevated temperature, in which case the stream of gasses entering the reaction chamber will be correspondingly enriched with the halogenating agent and will have a minimum damping effect on the temperature of the reaction zone. The reaction zone must be kept at a temperature at which the halogenating agent dissociates to form the resultant nascent halogen. In the case of carbon tetrachloride, this is $\sim 300°$ C. The temperature, however, should not exceed the melting point of either the alkali salt reactant or the alkali halide product but should be sufficient that the depth of action (penetration) is greater than the particle size.

The gasses leaving the reaction chamber will generally contain a mixture of carbon dioxide, halogen, and hydrochloric acid, as well as unreacted halogenating agent and higher derivative. Other gaseous components may be present, depending upon the nature of the salt which was introduced into the reaction chamber. For example, carbon tetrachloride will react with the carbonates and bicarbonates to produce a gaseous mixture containing unreacted carbon tetrachloride, chlorine, hexachlorethane, hydrogen chloride, carbon dioxide, and phosgene. Appropriate steps must be taken to handle these exiting gasses to trap or destroy the toxic and corrosive components. Such means, however, are well known to those skilled in the art and do not form part of the present invention.

Typical reactions which may be carried out by means of the present invention are illustrated by the following chemical equations:

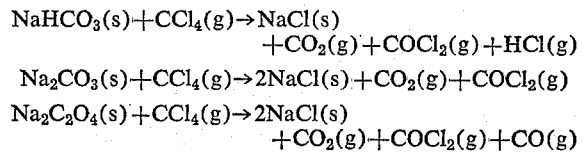

The gettering reactions of the halogenating agents utilized in this process are illustrated by the following equations:

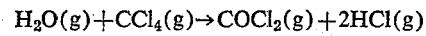
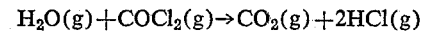

The reaction time will vary, depending upon a variety of circumstances. These include temperature, concentration of the halogenating agent, the quantity of the metal salt introduced into the reaction zone, the degree of fineness of said salt, as well as the facility with which the halogenating agent can flow through the bed of salt. It will also depend, to some extent, on the nature of the salt and the ease with which the anion may be replaced by the halide. A minimum of test runs will perhaps be necessary to determine the optimum conditions with respect to any set of variables, after which the process may be carried out repeatedly with success.

After the reaction is complete, the alkali halide, while under a halogenating atmosphere, is melted and cast into a polycrystalline mass in the reaction chamber. It is then cooled and transferred to a crucible for making a single crystal. The single crystal alkali halide may be formed in accordance with procedures currently used for growing such crystals, and the crystals may be processed in accordance with standard procedures into windows for lasers. Materials produced by the present invention will have significantly lower optical absorption coefficients at 10.6 microns, as compared to windows made from the same metal halides grown from products presently commercially available. Particularly useful windows have been manufactured from potassium chloride, sodium chloride, and potassium bromide, which have been prepared in accordance with the present invention. For example, windows produced from potassium chloride crystals manufactured in accordance with the present process have been shown to have absorption coefficients at 10.6 microns as low as 0.0005 cm.$^{-1}$.

The following examples are set forth to illustrate the present invention. They should not be deemed as limiting the scope thereof.

Example 1

10.6 gms. $Na_2CO_3$ powder of 100 mesh (U.S. Standard) was put into a reactor in a carbon ware boat. The temperature of the reactor was raised to 600° C. and a mixture of helium and carbon tetrachloride, produced by passing 100 cc./min. helium through $CCl_4$ at 22° C. was introduced continuously for fifteen hours. Exit gas was trapped in NaOH solution to neutralize HCl and phosgene. After ten hours, no more gaseous reaction products were detected. The reactor was heated to 850° C. to melt the product and then cooled to room temperature while maintaining an atmosphere of inert gas and $CCl_4$ in it. The weight of the polycrystalline cast product was 11.7 g. (theoretical yield: 11.7 g.).

Analysis showed the solid product was NaCl of 99.99 percent purity. Hydroxy contamination was less than a part in $10^5$.

Example 2

8.4 gms. $NaHCO_3$, 100 mesh powder, was put into a reactor in a silica ware boat. The temperature of the reactor was raised to 600–700° C. Helium was passed through $CBr_4$ contained in a straight drying tube which had Pyrex wool loose plugs at each end. The tube was held at room temperature, approximately 24° C., and helium was continuously passed through at 100 cc./min. for 18 hours. Exit gas from the reactor was trapped in NaOH solution. After 15 hours, the reaction was complete.

The reaction vessel was heated to 825° C. while maintaining an atmosphere of helium and $CBr_4$. The product, NaBr, was melted, and then allowed to cool. The cast polycrystalline product weighed 10.3 gms., which corresponds to the theoretical yield.

Example 3

8.4 gms. $NaHCO_3$ was treated as in Example 2 with a mixture of helium and phosgene (100:3) at a flow rate of 150 cc./min. and at a temperature of 500–600° C. for 20 hours. The reaction was completed in 15 hours. After the total treatment, the NaCl product was cast into a solid polycrystalline ingot.

Example 4

Approximately one-half kilogram sodium chloride of the quality made in Example 1 was placed in a quartz tube. The material was melted in a Bridgman vertical furnace and a crystal growth was carried on at the rate of four to five millimeters per hour. By this method we have grown cylindrical ingots which were five centimeters in diameter and 15 centimeters long. A crystal ingot was sliced with a wire saw impregnated with diamond, to provide discs about one-half inch thick. The resulting discs were given a fine polish, using a very fine alumina powder in alcohol. In this manner we obtained windows having an absorption coefficient of 0.0005 cm.$^{-1}$ at 10.6 microns. Mechanical testing of samples representative of this method of preparation yield values for modulus of rupture which were approximately double the value of 640 p.s.i. reported in the literature.

What is claimed is:

1. A method of preparing a compound of the formula MX, wherein M is an alkali cation and X is a halide, comprising contacting a finely divided alkali salt, said salt having an anion which can be displaced by gaseous halide, with a carbon halide in an anhydrous atmosphere and at a temperature at which said carbon halide dissociates to form corresponding free halogen but below the melting points of said alkali salt and said alkali halide until conversion is complete.

2. The method of claim 1 wherein X is $\frac{CO_3^-}{2}$, $HCO_3^-$, $HCOO-$, $\frac{-OOC-COO-}{2}$, or $CH_3COO-$.

3. The method of claim 1 wherein said alkali salt is a sodium salt or a potassium salt.

4. The method of claim 3 wherein said carbon halide is carbon tetrachloride or carbon tetrabromide.

5. The method of claim 4 wherein the alkali salt is $Na_2CO_3$ and the carbon halide is $CCl_4$.

6. The method of claim 4 wherein the alkali salt is $NaHCO_3$ and the carbon halide is $CCl_4$.

7. The method of claim 4 wherein the alkali salt is $Na_2C_2O_4$ and the carbon halide is $CCl_4$.

8. A method of preparing a compound of the formula MX, wherein M is an alkali cation and X is a halide, comprising contacting a finely divided alkali salt, said salt having an anion which can be displaced by gaseous halide, with a carbonyl halide in an anhydrous atmosphere and at a temperature at which said carbon halide acts by hydrolysis to form corresponding gaseous hydrogen halide but below the melting points of said alkali salt and said alkali halide until conversion is complete.

9. The method of claim 8 wherein the alkali salt is $Na_2CO_3$.

10. The method of claim 8 wherein the alkali salt is $NaHCO_3$.

11. The method of claim 8 wherein the alkali salt is $Na_2C_2O_4$.

References Cited

UNITED STATES PATENTS

| 3,007,772 | 11/1961 | Olstowski | 423—499 |
| 2,968,256 | 1/1961 | Verdieck et al. | 423—499 |
| 3,614,652 | 10/1971 | Nicolai | 350—1 |
| 3,722,977 | 4/1973 | Sloane | 350—1 |

OSCAR R. VERTIZ, Primary Examiner

B. E. HEARN, Assistant Examiner